US008235789B2

(12) United States Patent
Rasmussen

(10) Patent No.: US 8,235,789 B2
(45) Date of Patent: Aug. 7, 2012

(54) PUSH-BUTTON WITH INTEGRATED OR ADJACENT MOVEABLE OUTCOME INDICATOR

(75) Inventor: James M. Rasmussen, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1268 days.

(21) Appl. No.: 11/919,411

(22) PCT Filed: Apr. 28, 2006

(86) PCT No.: PCT/US2006/016707

§ 371 (c)(1),
(2), (4) Date: Oct. 26, 2007

(87) PCT Pub. No.: WO2006/116771

PCT Pub. Date: Nov. 2, 2006

(65) Prior Publication Data

US 2009/0312083 A1 Dec. 17, 2009

Related U.S. Application Data

(60) Provisional application No. 60/675,616, filed on Apr. 28, 2005.

(51) Int. Cl.
*A63F 13/00* (2006.01)

(52) U.S. Cl. .......................... 463/20; 273/138; 273/146

(58) Field of Classification Search .............. 463/16–20, 463/25–42; 273/146, 138
See application file for complete search history.

(56) References Cited

U.S. PATENT DOCUMENTS

| | | | | | |
|---|---|---|---|---|---|
| 2,693,962 | A | * | 11/1954 | Stevens | 273/145 D |
| 3,356,369 | A | * | 12/1967 | Stubbmann | 273/145 CA |
| 4,034,988 | A | * | 7/1977 | Goldner et al. | 463/22 |
| 4,506,890 | A | | 3/1985 | Murry | 273/138 |
| 4,858,931 | A | | 8/1989 | McKechnie | 273/138 |
| 5,031,914 | A | | 7/1991 | Rosenthal | 273/146 |
| 5,342,047 | A | | 8/1994 | Heidel et al. | 473/85 |
| 5,342,049 | A | | 8/1994 | Wichinsky et al. | 273/119 R |
| 5,344,145 | A | | 9/1994 | Chadwick et al. | 273/138 |
| 5,848,932 | A | * | 12/1998 | Adams | 463/20 |
| 5,951,397 | A | | 9/1999 | Dickinson | 463/36 |
| 6,028,271 | A | * | 2/2000 | Gillespie et al. | 178/18.01 |
| 6,060,672 | A | | 5/2000 | Sugihara | 200/61.1 |
| 6,102,394 | A | | 8/2000 | Wurz et al. | 273/138.2 |
| 6,117,010 | A | | 9/2000 | Canterbury et al. | 463/20 |
| 6,210,279 | B1 | * | 4/2001 | Dickinson | 463/37 |
| 6,227,970 | B1 | | 5/2001 | Shimizu et al. | 463/20 |

(Continued)

FOREIGN PATENT DOCUMENTS

EP 1083531 A1 * 3/2001

(Continued)

OTHER PUBLICATIONS

NPL Board game "trouble" Wekepedia page.*

(Continued)

*Primary Examiner* — Masud Ahmed
(74) *Attorney, Agent, or Firm* — Nixon Peabody LLP

(57) ABSTRACT

A push-button assembly for a gaming terminal implementing a wagering game is provided. The push-button assembly has a push-button actuated by a touch from a player of the wagering game. An outcome indicator indicates a randomly selected outcome in response to the push-button being actuated.

14 Claims, 5 Drawing Sheets

U.S. PATENT DOCUMENTS

| | | | | |
|---|---|---|---|---|
| 6,315,660 | B1 | 11/2001 | DeMar et al. | 463/16 |
| 6,331,145 | B1 | 12/2001 | Sity et al. | 463/22 |
| 6,454,649 | B1 | 9/2002 | Mattice et al. | 463/17 |
| 6,498,311 | B1 | 12/2002 | Stewart et al. | 200/313 |
| 6,517,433 | B2 | 2/2003 | Loose et al. | 463/20 |
| 6,581,935 | B1 * | 6/2003 | Odom | 273/269 |
| 6,638,166 | B2 | 10/2003 | Hedrick et al. | 463/20 |
| 6,722,985 | B2 | 4/2004 | Criss-Puszkiewicz et al. | 463/29 |
| 6,793,577 | B1 | 9/2004 | Wilkins et al. | 463/16 |
| 6,834,856 | B2 | 12/2004 | Wilson | 273/246 |
| 6,932,340 | B1 | 8/2005 | Schaefer et al. | 273/146 |
| 7,004,836 | B2 * | 2/2006 | Kaminkow et al. | 463/20 |
| 7,017,905 | B2 | 3/2006 | Lindsey | 273/146 |
| 7,060,922 | B2 | 6/2006 | Hoehne et al. | 200/314 |
| 7,195,560 | B2 | 3/2007 | DeMar et al. | 463/20 |
| 2001/0034264 | A1 | 10/2001 | Berman et al. | 463/22 |
| 2001/0050673 | A1 * | 12/2001 | Davenport | 345/163 |
| 2002/0111208 | A1 * | 8/2002 | Marta | 463/20 |
| 2002/0125119 | A1 * | 9/2002 | Cole et al. | 200/341 |
| 2002/0173354 | A1 | 11/2002 | Winans et al. | 463/20 |
| 2002/0183118 | A1 | 12/2002 | Wolinsky | 463/47 |
| 2003/0023735 | A1 * | 1/2003 | Funahashi et al. | 709/229 |
| 2003/0216174 | A1 | 11/2003 | Gauselmann | 463/30 |
| 2004/0038721 | A1 | 2/2004 | Wells | 463/16 |
| 2004/0038725 | A1 | 2/2004 | Kaminkow | 463/20 |
| 2004/0118669 | A1 | 6/2004 | Mou | 200/310 |
| 2004/0198485 | A1 * | 10/2004 | Loose et al. | 463/20 |
| 2004/0204241 | A1 * | 10/2004 | Houston | 463/37 |
| 2004/0266517 | A1 | 12/2004 | Bleich et al. | 463/20 |
| 2005/0056995 | A1 * | 3/2005 | Tempest et al. | 273/139 |
| 2005/0059458 | A1 | 3/2005 | Griswold et al. | 463/16 |
| 2005/0113163 | A1 | 5/2005 | Mattice et al. | 463/16 |
| 2005/0153780 | A1 | 7/2005 | Gauselmann | 463/47 |
| 2005/0181879 | A1 * | 8/2005 | Rothschild | 463/46 |
| 2006/0121967 | A1 * | 6/2006 | Paulsen et al. | 463/16 |
| 2006/0166728 | A1 * | 7/2006 | Cornell et al. | 463/16 |
| 2006/0178205 | A1 | 8/2006 | Bleich et al. | 463/20 |
| 2006/0247048 | A1 | 11/2006 | Mitchell et al. | 463/37 |

FOREIGN PATENT DOCUMENTS

| | | |
|---|---|---|
| JP | 08-215423 | 8/1996 |
| WO | WO 03/088164 | 10/2003 |

OTHER PUBLICATIONS

International Search Report dated Nov. 16, 2006 PCT/US06/16707 (2 pages).

* cited by examiner

PUSH-BUTTON WITH INTEGRATED OR ADJACENT MOVEABLE OUTCOME INDICATOR

CROSS-REFERENCE TO RELATED APPLICATIONS

This application is a U.S. national phase of International Application No. PCT/US2006/016707, filed Apr. 28, 2006, which claims the benefit of priority of U.S. Provisional Patent Application No. 60/675,616, filed Apr. 28, 2005, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having a push-button with an integrated or an adjacent movable outcome indicator.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Players of gaming machines have been presented with a variety of interface methods for entering commands into the gaming machine. Typical interface components are buttons, touch screen panels, and the traditional lever. Modern gaming machines are moving away from the lever and focusing more on touch screen and button technologies. The convenience of these offerings helps speed up the play of the games and causes much less exertion to the player.

Buttons on gaming machines have evolved over the years, most notably changing in shape and lighting. While many varieties, lighting types, and purposes exist today, the focus of the buttons has always been primarily to initiate commands. While the advent of the button panel has increased the rate of play and made it easier for the player to conduct the game, the buttons themselves have generally only provided input to the gaming machine from the player and have had very little to do with information feedback.

To increase the entertainment value of a game and create additional development and theme possibilities, variations on the button panel and to the buttons themselves would offer the gaming machine manufacturer additional latitude to help support unique themes and provide a variety of feedback to the player via unique interactive features.

SUMMARY OF THE INVENTION

According to one aspect of the present invention, a push-button assembly for a gaming terminal implementing a wagering game is provided. The push-button assembly has a push-button actuated by a touch from a player of the wagering game. An outcome indicator indicates a randomly selected outcome in response to the push-button being actuated.

According to another aspect of the present invention, a push-button assembly for a gaming terminal implementing a wagering game is provided. The push-button assembly has a push-button actuated by a touch from a player of the wagering game. The push-button assembly also has a 3-dimensional object related to the wagering game.

According to another aspect of the invention, a method of utilizing a push-button assembly for a gaming terminal implementing a wagering game is provided. A player input is received via a push-button of the push-button assembly. An outcome associated with the player input is indicated on an outcome indicator adjacent to or within the push-button.

According to an additional aspect of the invention, a gaming machine is provided for playing a wagering game. A push-button assembly has a push-button and an outcome indicator. A controller is coupled to the push-button assembly and is programmed to randomly select an outcome from a plurality of outcomes in response to the push-button being actuated by a player of the wagering game. The outcome is indicated on the outcome indicator.

Additional aspects of the invention will be apparent to those of ordinary skill in the art in view of the detailed description of various embodiments, which is made with reference to the drawings, a brief description of which is provided below.

DETAILED DESCRIPTION

Figure 1:
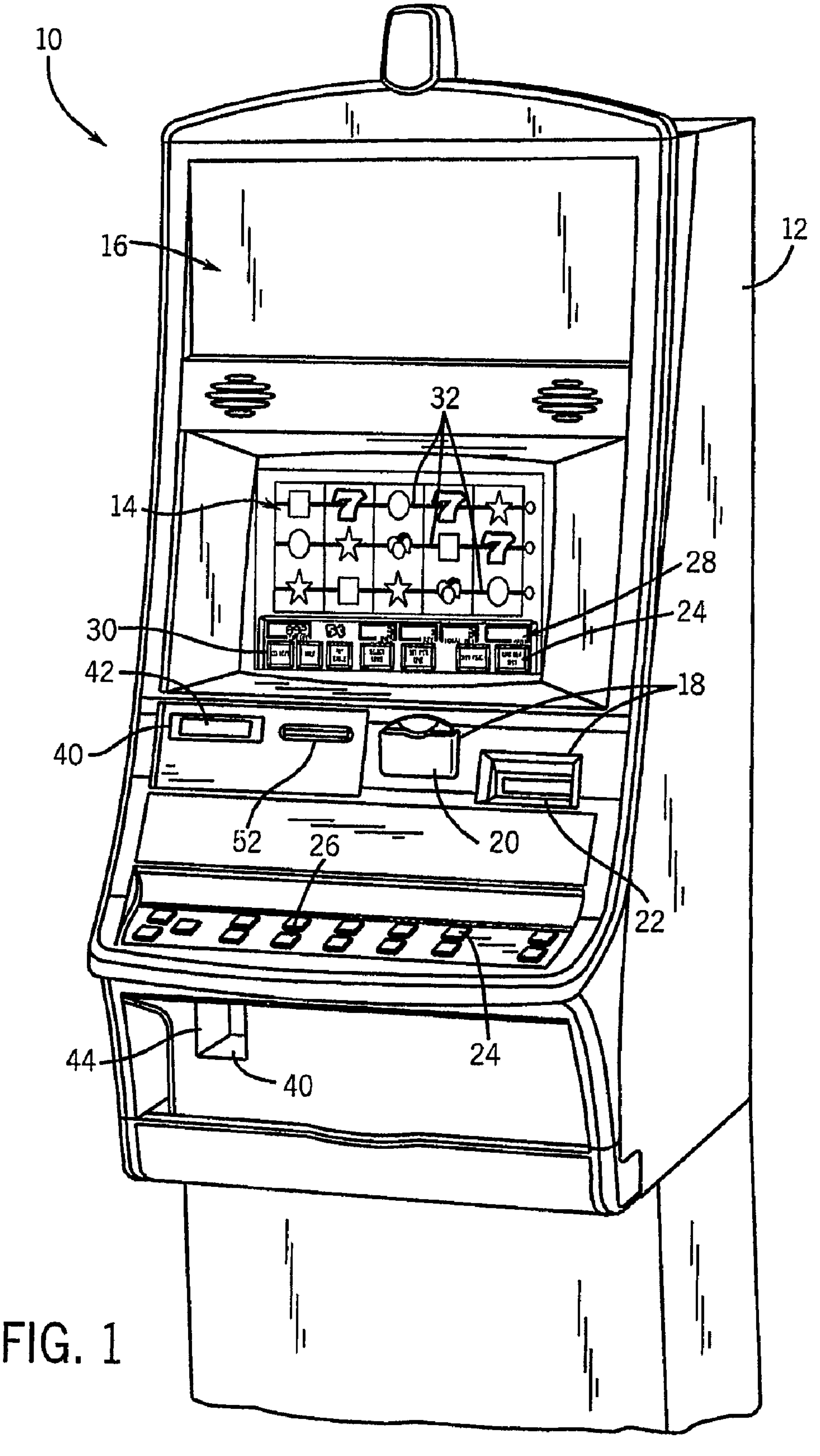
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push-buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push-button 26 on the button panel. The touch keys 30 may be used to implement the same functions as push-buttons 26. Alternatively, the push-buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an “upright” version in which the primary display 14 is oriented vertically relative to the player. Alternatively, the gaming machine may be a “slant-top” version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment’s loyalty club and may be awarded certain complimentary services as that player collects points in his or her player-tracking account. The player inserts his or her card into the player information reader 52, which allows the casino’s computers to register that player’s wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
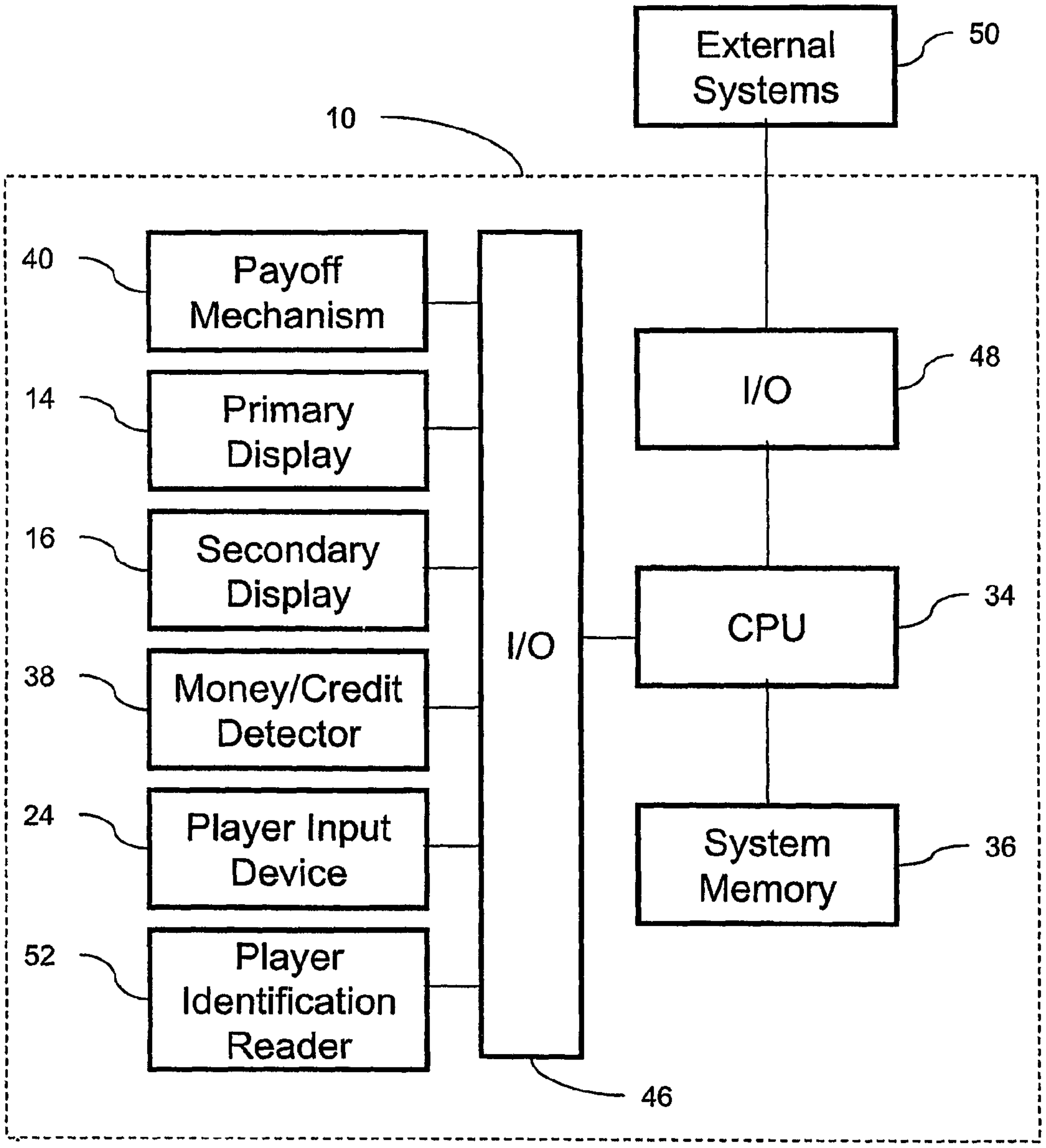
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Embodiments of the invention provide a push-button assembly having a push-button and an integrated or adjacent outcome indicator. The push-button assembly is housed within a gaming terminal that implements a wagering game. The outcome indicator indicates an outcome such as, e.g., a bonus, a payout, or a symbol which, when applied to other outcomes of the wagering game, can sometimes result in a bonus or a payout. The push-button assembly may be located on the button panel 26 or adjacent to the primary display 14. The outcome indicator may be a 3-dimensional object such as a mechanical reel on which various symbols are located.

The outcome indicator is activated by the player depressing the push-button of the push-button assembly. After the player has activated the outcome indicator, an outcome is randomly selected and is indicated by the outcome indicator. In an embodiment in which the basic wagering game is a slot game, the outcome indicator is activated separate from the main reels in the wagering game. For example, the player presses a "Spin Reels" button or pulls a lever to begin the spinning of the reels in the wagering game. The outcome indicator may be activated after the reels in the wagering game have begun spinning, or after at least one of the reels has stopped spinning in some embodiments. In other embodiments, the outcome indicator is activated before the reels in the wagering game have begun spinning. The controller 34 selects an outcome to be displayed on the outcome indicator.

Figure 3A:
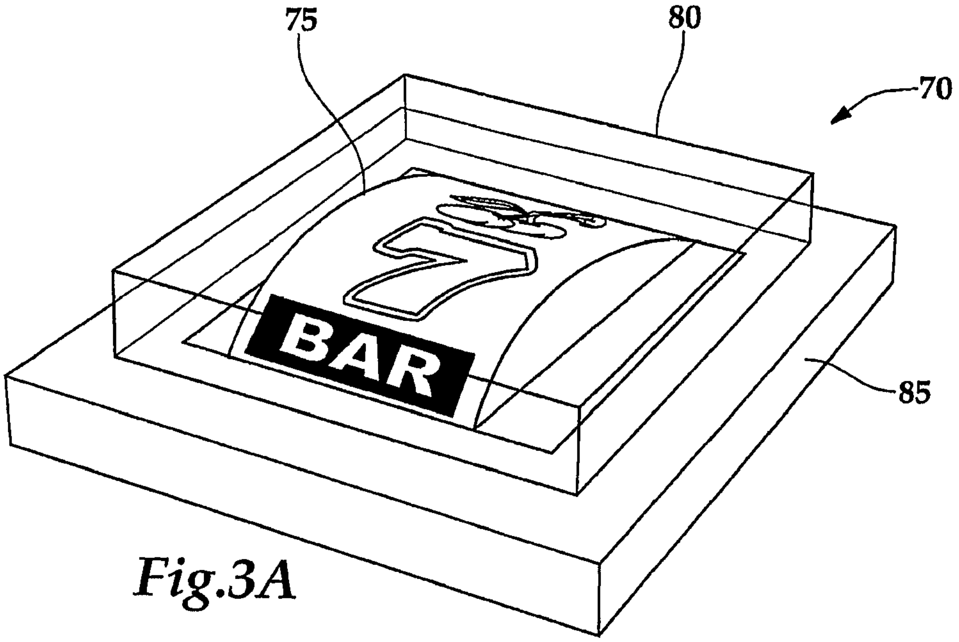
FIG. 3A illustrates a push-button button assembly according to an embodiment of the invention.
Figure 4:
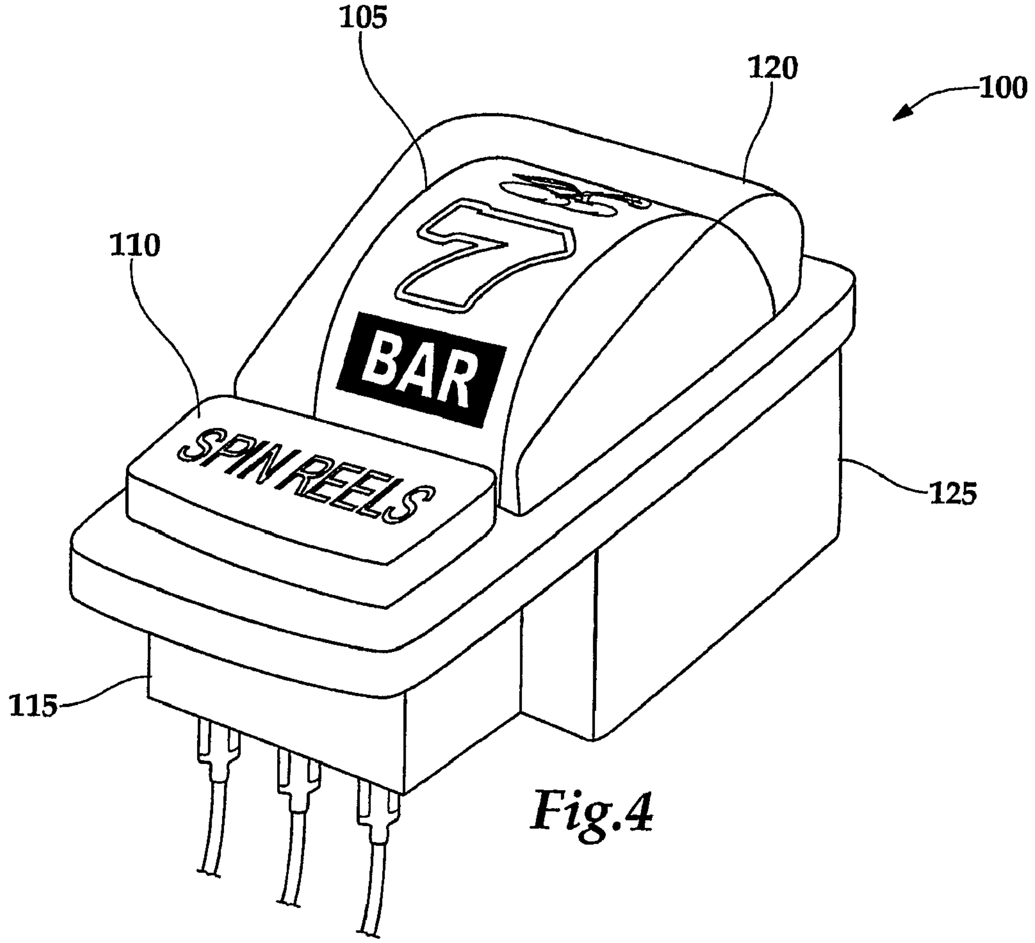
FIG. 4 illustrates another push-button assembly according to another embodiment of the invention.

There are several ways in which the outcome indicator is implemented, as indicated by FIGS. 3-5. In each of these ways, the player typically must physically touch the push-button of the push-button assembly to activate the outcome indicator. By requiring the player to physically touch the push-button, the player perceives that he/she has some control over the outcome.

FIG. 3A illustrates a push-button assembly 70 according to an embodiment of the invention. The push-button assembly 70 includes a depressible mechanical push-button cap 80. The push-button cap 80 is upwardly biased such that it moves downward in response to pressure but returns upward to its original position upon release of such pressure. The push-button cap 80 is coupled to a switch (not shown) located beneath it. The push-button cap 80 may be formed of a transparent material such as a hard plastic or acrylic. The push-button assembly 70 has a button housing 85 coupled to the push-button cap 80. Preferably, an interchangeable or moveable three-dimensional object is located within the button housing 85, and is visible through the push-button cap 80. The three-dimensional object shown in FIG. 3A is a miniature reel 75 on which various symbols are located. For example, the miniature reel 75 may include the standard symbols such as those normally shown on the main reels of a slot wagering game, or may include symbols for various game-enhancement parameters (discussed below), which may be implemented to enhance game play and provide bonuses, larger payouts, or payouts that are easier to achieve. In other words, the miniature reel 75 is a device for indicating an outcome.

The miniature reel 75 may include lighting elements such as multi-colored LEDs to illuminate the interior of the push-button assembly 70. Although the push-button assembly 70 is described as having a miniature reel 75, any suitable type of interchangeable 3-dimensional object may be contained within the push-button assembly 70 to indicate the symbol outcome that has been selected. Alternatively, a video image of a 3-dimensional object may be displayed under the push-button cap 80 of the push-button assembly 70, e.g., on an LCD display.

As discussed above, the player may initially make a wager, spin the main reels on the main displayed 14 (as shown in FIGS. 1-2) and then depress the push-button cap 80 to activate the spinning of the miniature reel 75. In other embodiments, the player is given the opportunity to utilize the push-button assembly 70 when a bonus has been achieved in the basic game.

In the event that the miniature reel 75 shows only the standard symbols normally shown on the main reels (e.g., "cherry" or "1-bar" symbols, etc.), the miniature reel 75 provides the player with an opportunity to achieve an enhanced outcome, e.g., a combination of four "cherry" symbols, even when only three main reels are utilized.

The miniature reel 75 may also be linked to a skill stop function such that the player perceives that he/she is stopping the miniature reel 75 by a second depressing of the push-button cap 80, when, as discussed above, the miniature reel 75 is actually stopped randomly. Thus, after the initial depressing of the push-button cap 80, the player presses the push-button cap 80 a second time in an attempt to stop the reel 75.

In a further alternative, a miniature video display may be placed alongside the miniature reel 75 or, if the video display is transmissive (using a transmissive LCD or a flexible LED display), the video display could be placed on the transparent button cap 80 over the miniature reel 75 such that an image could be superimposed over the miniature reel 75.

Figure 3B:
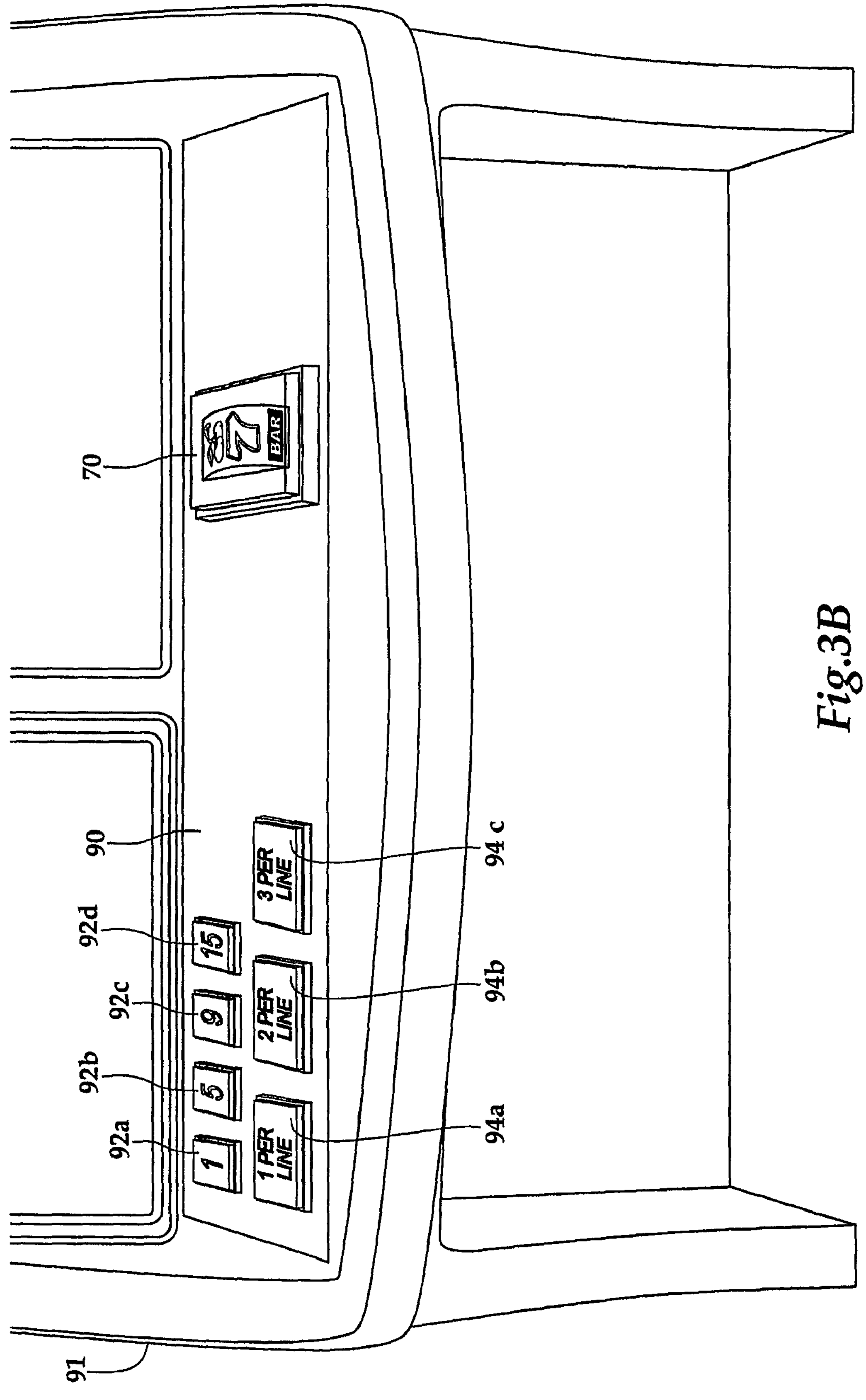
FIG. 3B illustrates a push-button panel of the gaming machine having the push-button button assembly of FIG. 3A.

FIG. 3B illustrates a push-button panel 90 of the gaming machine 91 having the push-button assembly 70 of FIG. 3A. A plurality of payline buttons 92 (i.e., 92*a*, 92*b*, 92*c*, and 92*d*) indicates the number of paylines that the player desires to play during the wagering game. There may be, e.g., fifteen paylines that the player may select during the wagering game, or any other suitable number of paylines. The gaming machine 91 also includes bet-per-line buttons 94 (i.e., 94*a-c*) to allow a player to place one, two, or three credit wagers on each of the selected paylines of the main game. While the present embodiment shows four payline buttons 92 and three bet-per-line buttons 94, the present invention is also useful on gaming machines 91 having more or less of these payline and bet-per-line buttons 92 and 94. The push-button assembly 70 may be housed in any suitable location on the push-button panel 90.

FIG. 4 illustrates an alternative push-button assembly 100 according to an embodiment of the invention. The push-button assembly 100 includes a depressible mechanical push-button 110 directly adjacent to an outcome indicator 105, e.g., the miniature reel. As illustrated, the outcome indicator 105 is located adjacent to the "Spin Reels" push-button 110 on the push-button panel of the gaming machine 91. The "Spin Reels" push-button 110 is coupled to a push-button switch 115 located beneath it. The push-button assembly 100 includes a cap 120. The cap 120 may be formed of a transparent material such as a hard plastic or acrylic. The push-button assembly 100 has a button housing 125 coupled to the cap 120 and the push-button 110. An interchangeable or moveable three-dimensional object is located within the button housing 125, and is visible through the cap 120. Various symbols are located on the miniature reel 105. The miniature reel 105 is similar to the miniature reel 75 of FIG. 3A. However, unlike the miniature reel 75 of FIG. 3A, to spin the miniature reel 105 of FIG. 4, the player depresses the "Spin Reels" button 110 instead of the cap 120.

In additional embodiments, the outcome indicator does not utilize a mechanical reel or a video reel. Instead, it may utilize other 3-dimensional objects, or a video rendering of 3-dimensional objects such as those described below with respect to FIGS. 5A-5E. The various embodiments of the push-button assembly are utilized to present different themes for the push-button assembly for wagering games such as blackjack, slots, keno, poker, roulette, etc.

In some embodiments, the assembly includes a touch-sensitive surface located on the cap or, if the assembly incorporates a video display for rendering 3-dimensional objects, on the video display. The player may touch the touch-sensitive surface to provide the feeling as though the outcome is being controlled by the player.

Figure 5B:
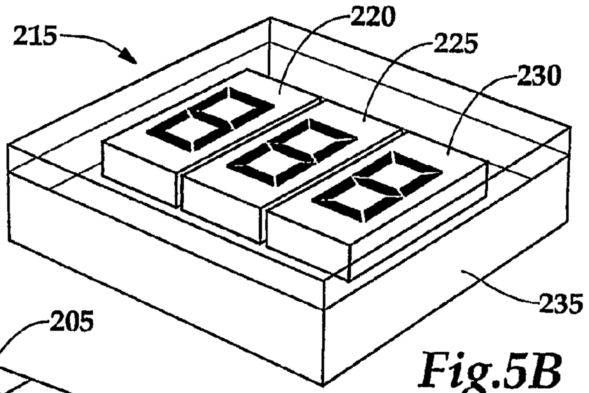
FIGS. 5A-5E illustrate push-button assemblies utilized to present different game themes and 3-dimensional objects according to embodiments of the invention.
Figure 5A:
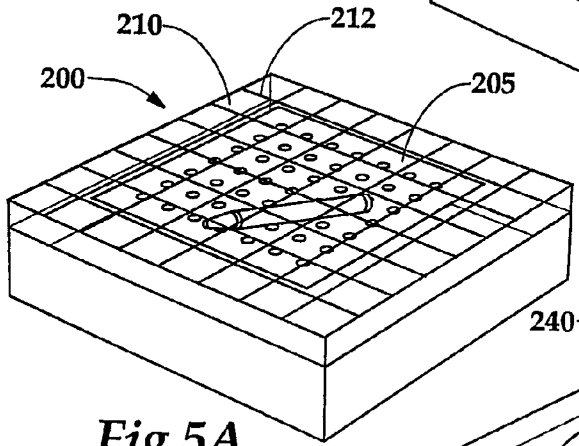

FIG. 5A illustrates a push-button assembly 200 having a keno board displayed under a button cap 210. The push-button assembly 200 may be utilized, e.g., when the wagering game on the primary display 14 is keno. The player selects numbers on the keno board via the push-buttons on the push-button panel of the gaming machine 10 or by touching a touch-sensitive surface 205. After the player touches the touch-sensitive surface 205, the player depresses the cap 210, causing the winning numbers to be displayed. The player may receive a payout or other award if the player has selected keno numbers that correspond to winning keno numbers.

As illustrated, the touch-sensitive surface 205 shown in FIG. 5A includes several intersecting sensors/wires 212 that sense a touch from the player. As shown, the sensors/wires 212 may form a grid across the touch-sensitive surface 205. The player may select one of the keno numbers by touching an area of the touch-sensitive surface 205 corresponding to the number positioned below the cap 210. Other touch-sensitive surfaces 205 can be used as well. Although visible in FIG. 5A, the sensors/wires 212 are typically transparent so as to not interfere with game play.

A touch-sensitive surface 205 may also be utilized in an alternative embodiment where the outcome indicator is a miniature reel (as shown in FIGS. 3-4). The miniature reel may be actuated by the player swiping the touch-sensitive surface 205 of the cap 210 with a finger to provide the feeling on controlling the speed of miniature reel. That is, the speed at which the player swipes the finger appears to alter the speed of the miniature reel, even though the outcome of a spin of the miniature reel is a random event. In some embodiments, an additional wager is required before the player has the opportunity to activate the miniature reel.

FIG. 5B illustrates a push-button assembly 215 having LEDs 220, 225, and 230 positioned beneath a button cap 235. The LEDs 220, 225, and 230 may display, e.g., a randomly selected number, and the player may receive a payout based on the randomly selected number. The player may depress the button cap 235, and then a randomly generated number will be displayed on the LEDs 220, 225, and 230. For example, if the number "24" is displayed, the player may receive a payout of 24 credits. LEDs 220, 225, and 230 may also display single digits that the player hopes to match with digits the player has selected or was assigned. Alternatively, each of the LEDs 220, 225, and 230 could each be contained on separate miniature reels, and the outcome of each miniature reel being spun displays each respective digit of the randomly generated number.

Figure 5C:
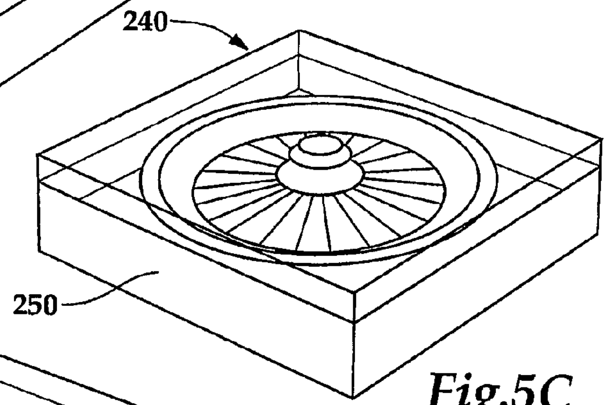

FIG. 5C illustrates a push-button assembly 240 displaying a 3-dimensional roulette wheel displayed below a button cap 250. The push-button assembly 240 may be utilized, e.g., when the wagering game on the primary display 14 is a roulette game. The player selects a number or color (possibly through a touch-sensitive surface on the cap 250) and depresses the cap 250 to cause the roulette wheel to begin spinning. If the marble/roulette ball on the roulette wheel stops on the selected number or color, the player is awarded a payout or other award.

Figure 5D:
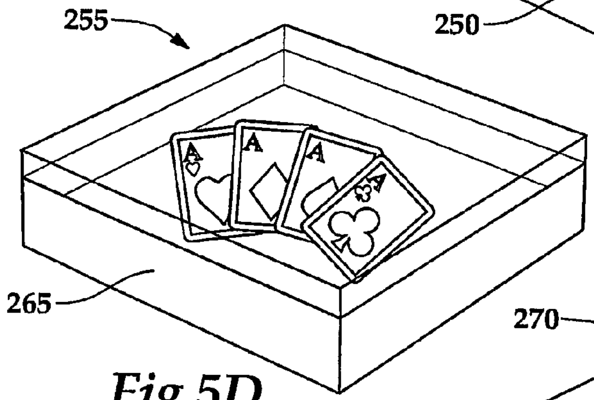

FIG. 5D illustrates a push-button assembly 255 displaying playing cards below a button cap 265. The push-button assembly 255 may be utilized, e.g., when the wagering game on the primary display 14 is a card game such as poker or blackjack. The player depresses the button cap 265 and then a set of cards are shown to the player. For example, the cards could be implemented as a blackjack game and the player depresses the button cap 265 when the player desires to "hit," "stay," "double down," etc. The cards could also be implemented as a video poker game where the player is dealt cards and the player depresses the button cap 265 when the player desires to trade in cards, etc. Based on the outcome of the player's hand, the player may be awarded a payout or other bonus. Alternatively, when a winning outcome is achieved in the main wagering game, the player has the opportunity to depress the button cap 265, and certain winning combinations of the displayed hand of cards result in various bonuses, such as 2×, 3×, 5×, etc.

Figure 5E:
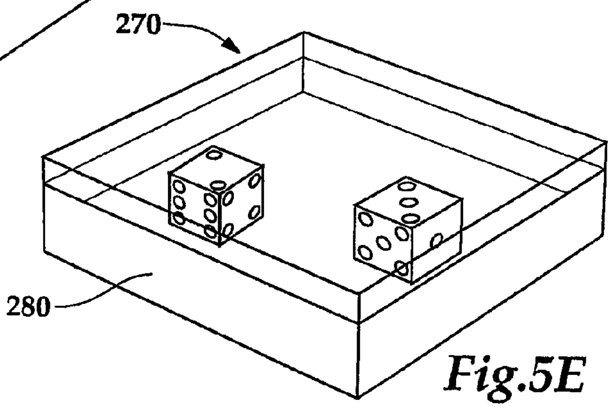

FIG. 5E illustrates a push-button assembly 270 displaying a video representation of dice below a button cap 280. The button cap 280 may be utilized with practically any wagering game on the primary display 14. The player depresses the button cap 280 and then a video representation of the mechanical dice are rolled. Based on the outcome of the roll of the dice, the player may be awarded an additional payout or an enhancement to the payout in the basic game.

Instead of displaying dice below tie button cap 280, other embodiments may utilize physical dice that are in a fixed position and are encased or suspended in a clear acrylic or other clear material. The dice may also be embedded or connected to a base and covered by the clear button cap 280 comprised of acrylic or other clear material. The dice may be embedded in the base with a surface around the dice being opaque. The dice may be transparent and of a variety of colors depending on the theme and other requirements of the game. Light emitting diodes (LEDs) could be positioned around the outer edge of the button under the surface. The LEDs illuminate the area beneath the surface and light passes through the translucent dice as initiated by the game. This provides a "glow" to the dice when the LEDs are lit. LEDs are positioned to represent the spots on a regular six-sided die and can produce all of the possible outcomes of a typical dice combination and, depending on the requirements of the game, non-standard combinations. Upon depressing the button cap 280, a random combination of recognizable numeric values are displayed on the dice. The push-button assembly 270 can be used to realize a value for an award, or may be used to initiate movement, such as on a gaming board on the primary display 14 or secondary display 16. When the button cap 280 is depressed, it activates a switch or actuator that initiates a random number generator on the controller 34 of the gaming machine 10 that randomly determines a number between one and twelve (or other values depending on the type of dice and the possible numeric values). The result is transmitted back to the push-button assembly 270 and is displayed by illuminating the appropriate LEDs on the dice. While this example is with respect to a typical dice pair, it should be recognized by those with ordinary skill in the art that any numeric value displayed on any type of dice that can support a numeric value is also viable. Further information concerning a push-button assembly 270 incorporating dice may be obtained from U.S. application Ser. No. 11/052,590 entitled "Gaming Machine With Button Panel Features," filed Feb. 7, 2005, and incorporated herein by reference in its entirety.

Although only FIG. 5A is described as having a touch-sensitive surface 205 on its button cap 210, FIGS. 5B-E could also utilize touch-sensitive surfaces in implementing the outcome indicator.

In addition to, e.g., a mechanical reel, the push-button assemblies described above may also house another 3-dimensional object such as a diorama. A diorama may be a 3-dimensional miniature scene having objects arranged in a naturalistic setting against a painted background. As an example, one can consider the roulette wheel described above with respect to FIG. 5C to be a diorama.

Other embodiments of the invention display an outcome indicator having or displaying, e.g., a pointer or a pendulum for indicating the outcome. The pointer may be a physical object, such as an arrow, that points to an outcome selected for the player. Alternatively, the pointer may be a video representation of an object, such as the arrow, that points to the selected outcome. The pendulum may be a physical pendulum that moves back and forth across a set of possible outcomes and stops on the selected outcome. Alternatively, the pendulum may be a video representation of a pendulum.

A further alternative embodiment includes a transmissive LCD display. The transmissive LCD display may be utilized when a 3-dimensional object such as a mechanical reel is utilized and is housed below the button cap. In such embodiments, the transmissive LCD display may display images/symbols that interact with the 3-dimensional object to provide enhanced images. For example, the transmissive LCD display can create an illusion of different colors such that, e.g., a 3-dimensional object below the button cap appears to change colors. Further information concerning the use of a transmissive LCD over a mechanical object may be obtained from U.S. Patent Publication No. 2004/0198485 entitled "Gaming Machine With Superimposed Display Image," filed Nov. 7, 2003, and incorporated herein by reference in its entirety.

In some embodiments, the outcome indicator, e.g. 75 or 105 of FIGS. 3 and 4, respectively, displays game-enhancement parameters. For example, if the outcome indicator is a mechanical reel, after the mechanical reel 75 or 105 has begun spinning and then stops spinning, a game-enhancement parameter displayed in the center of the visible portion of the miniature reel 75 or 105 is implemented if applicable. A game-enhancement parameter provides a player with additional excitement during play. Different types of game-enhancement parameters provide the player with the opportunity to achieve a higher payout or make it easier for the player to achieve a payout or other award.

The various game-enhancement parameters may include, for example: "2×," "5×," "10×," "MAGIC MAYHEM," "MAGIC NUDGE," "PRESTO," "PAY 5," "PAY 10," "PAY 25," "UPGRADE," "DIFFERENT PAY TABLE," "EXTRA WILD," "SCATTER," "RIGHT-TO-LEFT," "RE-SPIN," "MORPH," "INCREASED WAGER," "HOLD SYMBOL," and "SYMBOL MOVEMENT," as described below. In some embodiments, the game-enhancement parameter can only award an enhanced payout if the player has achieved a winning combination in the main game. In all of the alternatives discussed below, it is assumed that the game-enhancement parameter is indicated via the outcome indicator of the push-button assembly.

2×, 5×, and 10×: The 2×, 5×, and 10× game-enhancement parameters are multiplier game-enhancement parameters that multiply a payout or other outcome awarded to the player based on the outcome on the main reels of a slot wagering game. In the event that, e.g., the 2× symbol is indicated by the outcome indicator, a payout awarded for a winning combination on the three main reels will be multiplied by a factor of 2. However, if the player does not achieve a winning combination on the three main reels, the player will not be awarded a double payout because there is no payout to double.

Similarly, if the 5× or 10× game-enhancement parameters are indicated by the outcome indicator, a payout earned based on a winning combination on the three main reels would be multiplied by factors of 5 and 10, respectively. Although only 2×, 5×, and 10× multiplier game-enhancement parameters are discussed above, it should be appreciated that any suitable multiplier game-enhancement parameter could be utilized such as, e.g., 15× or 25×.

MAGIC MAYHEM: When the MAGIC MAYHEM game-enhancement parameter is indicated by the outcome indicator and the player has achieved a winning combination on the main reels, the main reels are re-spun to the same winning combination a predetermined number of times, resulting in enhanced payouts. For example, in the even that a winning combination of three "cherry" symbols on an active payline of the main reels is achieved when the MAGIC MAYHEM game-enhancement parameter is indicated, the main reels are re-spun to the three "cherry" symbols combination at least once. Accordingly, if the MAGIC MAYHEM re-spins the main reels 3 times, the player will be awarded an enhanced payout that is 4 times the size of the payout normally awarded for the symbol combination on the main reels (i.e., the value of the payout for the winning combination based on the initial spin, and the value of the 3 payouts achieved on the 3 re-spins).

MAGIC NUDGE: The MAGIC NUDGE game-enhancement parameter is advantageous in situations where a better payout can be achieved by moving symbols on one (or multiple) reels either up or down across a payline. This game-enhancement parameter automatically "nudges" the reels to the better symbol combination to achieve a higher payout. For example, in the event that three main reels display a combination of "3-bars," "3-bars," and "1-bar" symbols on an active payline, and a "3-bars" symbol is located directly above the "1-bar" symbol on the third reel, the symbols on the third reel would be nudged downward so that three "3-bars" symbols are displayed on the payline, resulting in a higher payout.

PRESTO: When a winning combination appears on the three main reels, the PRESTO game-enhancement parameter re-spins the three main reels to a better winning combination. In some embodiments, the reels are re-spun to the next best winning combination according to a pre-determined pay table (e.g., from a winning combination that pays out 1 credit to a winning combination that pays out 2 credits). In other embodiments, the reels are re-spun to any better winning combination (e.g., from a winning combination that pays out 1 credit to a winning combination that pays out 8 credits). In some embodiments, the player forfeits a payout based on the initial winning combination and, instead, receives only the higher payout.

PAY 5, PAY 10, and PAY 20: When a winning combination appears on the three main reels and the outcome indicator indicates the PAY 5, PAY 10, or the PAY 20 game-enhancement parameter, 5, 10, or 20 extra credits are added to the player's payout. In other embodiments, a winning combination is not required to receive the extra payout.

UPGRADE: The UPGRADE game-enhancement parameter causes a winning symbol combination to move up at least one or two winning symbol combinations on the pay table for the gaming machine 10. For example, a lower-paying combination of three "cherry" symbols may pay out as if the player had achieved three "3-bars" symbols, a better combination.

DIFFERENT PAY TABLE: The DIFFERENT PAY TABLE game-enhancement parameter implements a different and higher-paying pay table, awarding larger payouts for various symbol combinations. For example, if a combination of three "cherry" symbols normally pays out 2 credits for each credit wagered, the DIFFERENT PAY TABLE game-enhancement parameter may result in a payout of 3 credits for each credit wagered for the combination. Thus, if the outcome indicator indicates the DIFFERENT PAY TABLE symbol, a new pay table can be illustrated to the player.

EXTRA WILD: The EXTRA WILD game-enhancement parameter causes a symbol that is normally a regular symbol, such as a "cherry" symbol or a "1-bar" symbol, to become a wild symbol. For example, in the event that (a) the player achieves a combination of consecutive "3-bars," "3-bars," and "1-bar" symbols, and (b) and the EXTRA WILD game-enhancement parameter causes all "1-bar" symbols to become wild symbols, then (c) the wild "1-bar" symbol would represent a "3-bars" symbol, and the player would be awarded a payout for achieving a combination of three "3-bars" symbols. This combination would provide a larger payout than the initial combination.

SCATTER: The SCATTER game-enhancement parameter converts a single-line pay into a scatter payout, such that a winning combination of symbols need not be located all on a single active payline. As such, the best possible symbol combination on the display 14 results in the award to the player.

RIGHT-TO-LEFT: Many slot games require that winning combinations be comprised of symbols on consecutive reels, and must start with the left-most reel (i.e., these slot games require a "left-to-right" combination of symbols). The RIGHT-TO-LEFT game-enhancement parameter allows "right-to-left" combinations (i.e., combinations starting on the right-most reel and extending left across the reels) to win, in addition to the standard winning "left-to-right" combinations. This game-enhancement parameter is particularly applicable to a slot game having five (or more) reels. For example, if the five symbols on the payline from the left-most reel are "cherry," "1-bar," "1-bar," "1-bar," and "1-bar," the player would not have achieved a winning combination of a machine paying left-to-right only. However, if the RIGHT-TO-LEFT game-enhancement parameter were implemented, then the player would have a winning combination of symbols (i.e., the four "1-bar" symbols from the right side).

MORPH: The MORPH game-enhancement parameter allows one or more symbols on the reels to morph into other symbols that are more beneficial. For example, if the player gets a combination of two "cherry" symbols and a "1-bar" symbol, and (a) the two "cherry" symbols combination provides a certain winning payout, and (b) a combination of three "cherry" symbols would result in a higher winning payout, then the "1-bar" symbol morphs into a "cherry" symbol, resulting in the higher-paying winning combination.

INCREASED WAGER: A winning combination typically results in a payout that is generally proportionate to the amount wagered. For example, when five credits are wagered and the player achieves a winning combination, the payout is at least five times as large as it would have been if only one credit had been wagered. The INCREASED WAGER game-enhancement parameter treats a winning combination as though the player had bet the maximum amount, thereby effectively increasing the wagered amount, resulting in a higher payout. For example, of the player had only wagered 1 of 5 possible credits, the INCREASED WAGER game-enhancement parameter would treat the player's wager as though 5 credits had been wagered.

HOLD SYMBOL: The HOLD SYMBOL game-enhancement parameter holds a symbol in a certain location on one of the reels so that a final symbol combination across the reels must take into account the held symbol. For example, in the event that a "1-bar" symbol is one of the more valuable symbols available, a reel displaying this symbol may be held (i.e., not spun) while the remainder of the reels spin. The symbol on the reel that is held may be selected by the player from a list of different hidden symbols, or may be randomly assigned to the player. Accordingly, when the other reels are spun, the player has a greater chance of receiving a high payout (e.g., by a winning combination including the valuable held symbol).

SYMBOL MOVEMENT: The SYMBOL MOVEMENT game-enhancement parameter allows symbols to move to other locations along a payline if it would result in a better outcome (e.g., a higher payout). For example, symbols can move up or down on the same reel, or they can move across reels if such movement results in a better combination for the player.

The game-enhancement parameters discussed above are merely examples, and it should be appreciated that this list is not exhaustive. In practice, additional types of game-enhancement parameters may be indicated to the player. Although the game-enhancement parameters are described above primarily with respect to slot wagering games, some of these game-enhancement parameters are also applicable to other wagering games such as keno, blackjack, poker, roulette, etc. Not all game-enhancement parameters provide winning outcomes in the event that the player fails to achieve a winning outcome in the basic game.

Each of these embodiments and obvious variations thereof is contemplated as falling within the spirit and scope of the claimed invention, which is set forth in the following claims.

What is claimed is:

1. A push-button assembly for a gaming terminal implementing a wagering game, the push-button assembly comprising:

a push-button actuated by a touch from a player of the wagering game; and an outcome indicator integrated within the push-button assembly, the outcome indicator being configured to indicate a randomly selected outcome responsive to an output of an outcome from a wagering game processor to the push-button assembly, wherein the outcome indicator is a mechanical object disposed within the push-button and configured to move relative to the push-button to reveal the outcome for the mechanical object output by the wagering game processor.

2. The push-button assembly of claim 1, wherein the movable mechanical is a removable 3-dimensional object.

3. The push-button assembly of claim 1, wherein the moveable object is selected from the group consisting of: a miniature reel, a pointer, and a pendulum.

4. The push-button assembly of claim 1, wherein the outcome indicator is a mechanical reel.

5. The push-button assembly of claim 1, wherein the outcome indicator displays a game-enhancement parameter selected from the group consisting of: a bonus payout; a multiplier to multiply the payout awarded based on a winning symbol combination on main reels in the wagering game; a re-spin feature to re-spin a winning symbol combination in the wagering game to the same winning symbol combination at least one time; an automatic nudge feature; and a re-spin to a higher award feature to re-spin the main reels in the wagering game to a higher-paying winning symbol combination in response to the winning combination being achieved in the wagering game.

6. The push-button assembly of claim 1, further including a removable transparent enclosure positioned over the outcome indicator.

7. The push-button assembly of claim 6, further including a touch-sensitive sensor positioned on the transparent enclosure

8. The push-button assembly of claim 1, further including a transmissive LCD display for displaying a video image superimposed over the outcome indicator.

9. The push-button assembly of claim 1, wherein the outcome indicator is selected from the group consisting of: a mechanical reel; a keno board; a roulette wheel; playing cards; a pointer; a pendulum; and at least one die.

10. A method of utilizing a push-button assembly installed in a gaming terminal configured to implement a wagering game, the method comprising:

receiving a player input via a push-button of the push-button assembly;

processing the player input using a processor communicatively coupled to the push-button and operatively associated with the gaming terminal;

outputting an outcome from the processor to the push-button; and indicating the outcome associated with the player input on a movable mechanical outcome indicator integral with the push-button assembly and disposed within the push-button.

11. The method of claim 10, wherein the outcome indicator is a 3-dimensional object.

12. The method of claim 10, wherein the outcome indicator includes a representation of a moveable object, the representation of the moveable object is selected from the group consisting of: a miniature reel; a pointer; a pendulum; a keno board; a roulette wheel; playing cards; and at least one die.

13. The method of claim 10, wherein the outcome indicator is a mechanical reel.

14. The push-button assembly of claim 1, wherein the outcome indicator is configured to display one or more symbols selected from a plurality of symbols.

* * * * *